US008344693B2

(12) United States Patent
Budziszek et al.

(10) Patent No.: US 8,344,693 B2
(45) Date of Patent: Jan. 1, 2013

(54) HANDHELD ROTATIONALLY RECHARGEABLE ELECTRONIC APPARATUS

(76) Inventors: Bobby Lee Budziszek, Middletown, RI (US); Collin James McMaster, Elma, WA (US)

( * ) Notice: Subject to any disclaimer, the term of this patent is extended or adjusted under 35 U.S.C. 154(b) by 389 days.

(21) Appl. No.: 12/820,406

(22) Filed: Jun. 22, 2010

(65) Prior Publication Data

US 2011/0309794 A1 Dec. 22, 2011

(51) Int. Cl.
*H02J 7/00* (2006.01)
(52) U.S. Cl. .............. 320/114; 320/112; 322/1; 290/1 A; 290/1 R; 290/50
(58) Field of Classification Search .................. 320/112, 320/114; 322/1; 290/1 A, 1 R, 50
See application file for complete search history.

(56) References Cited

U.S. PATENT DOCUMENTS

| | | | | |
|---|---|---|---|---|
| 5,949,215 | A * | 9/1999 | Takakura | 320/114 |
| 6,316,906 | B1 * | 11/2001 | Lozada | 320/101 |
| 6,930,403 | B2 | 8/2005 | Hartman et al. | |
| 8,030,903 | B2 * | 10/2011 | Matsubara | 320/166 |
| 8,115,327 | B2 * | 2/2012 | Yomoda et al. | 290/1 E |
| 2004/0204180 | A1 | 10/2004 | Liao | |
| 2007/0035134 | A1 | 2/2007 | Bristow, Jr. | |
| 2008/0157536 | A1 | 7/2008 | Bulthaup et al. | |
| 2009/0058360 | A1 * | 3/2009 | Kuo | 320/114 |
| 2009/0085530 | A1 * | 4/2009 | Matsubara | 320/166 |
| 2010/0124948 | A1 | 5/2010 | Johnston | |
| 2011/0175367 | A1 * | 7/2011 | Matsumoto | 290/1 A |

FOREIGN PATENT DOCUMENTS

DE 199 55 492 5/2001

* cited by examiner

*Primary Examiner* — Edward Tso
*Assistant Examiner* — Manuel Hernandez
(74) *Attorney, Agent, or Firm* — Cesari and McKenna, LLP; John F. McKenna

(57) ABSTRACT

A rotationally rechargeable electrical apparatus includes an electronic device with a back, a center of mass and a battery. An electrical generator at the back of the device has a rotor secured to the device and a stator having a flat contact surface extending parallel to the back of the device. The rotor and stator are rotatably connected together so that they can rotate relatively about an axis that extends perpendicular to the contact surface and passes through the center of mass. A voltage regulating circuit is connected electrically between the generator and the battery so that when the apparatus is placed on a support so that the contact surface frictionally engages the support and the device is spun about the axis, the generator produces an electrical output that is conditioned by the regulator circuit to charge the battery.

19 Claims, 5 Drawing Sheets

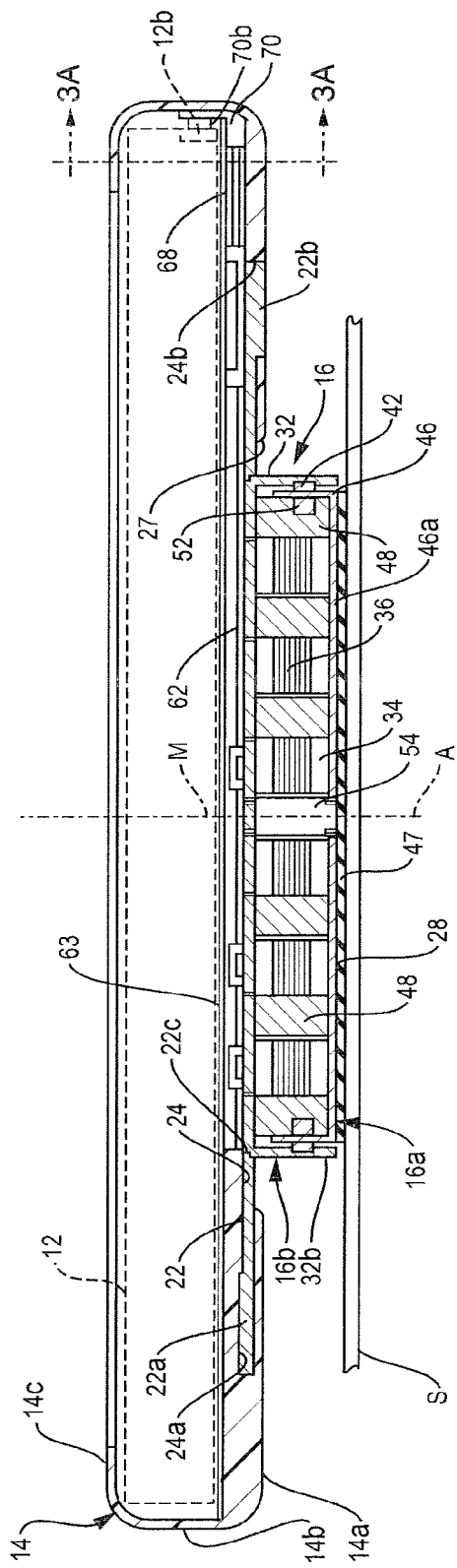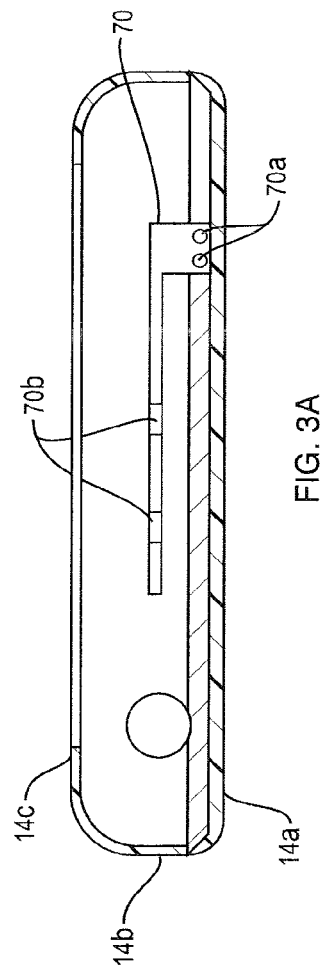

text only …

HANDHELD ROTATIONALLY RECHARGEABLE ELECTRONIC APPARATUS

This invention relates to a handheld battery-powered electric or electronic device. It relates especially to such a device whose batteries may be recharged without requiring an external power source.

BACKGROUND OF THE INVENTION

Small handheld or portable battery-powered devices are becoming ever more prevalent. These devices include cell phones, cameras, electronic games, radios, TVs, flashlights, GPS, receivers, recording and playback devices, etc. In many cases, such devices are powered by one or more batteries of the rechargeable type.

The main disadvantage of such battery powered devices is that external power to recharge the batteries is not always available. For example, one of the biggest markets for cell phones is in so-called third world countries, many of which do not have a good network of telephone landlines. However, those countries are just as likely to not have a reliable electrical network for distributing power to people's homes and businesses. Therefore, in order to recharge the batteries of their cell phones, users are often required to so do at a central location that does have electrical power, which is an inconvenience to the users. Even in developed countries, there are situations in which a device user may find him or herself without power, e.g. while camping, sailing, skiing, etc., or without the ability to plug in a charger, e.g. while on a plane or attending a long meeting.

Accordingly, it would be desireable to be able to have a handheld electronic device whose battery may be recharged without the benefit of electrical power from an external source.

SUMMARY OF THE INVENTION

Accordingly, the present invention aims to provide an improved handheld or portable battery-powered apparatus of the types identified above.

Another object of the invention is to provide such apparatus whose battery can be recharged in the absence of an external power source.

A further object of the invention is to provide apparatus of this nature whose battery can be recharged very easily, even by technically unsophisticated users.

Yet another object of the invention is to provide a handheld battery-powered apparatus which houses, in a single compact package, all of the components necessary to operate the apparatus and recharge its battery.

Another object of the invention is to provide a case for a handheld battery-powered device which is capable of recharging the device's battery or batteries.

Other objects will, in part, be obvious and will, in part, appear hereinafter.

The invention accordingly comprises the features of construction, combination of elements and arrangement of parts which will be exemplified in the construction hereinafter set forth, and the scope of the invention will be indicated in the claims.

Briefly, the present apparatus includes a battery-powered electrical or electronic device and an attached electric generator. The generator includes a rotor secured to a wall of the device and a stator projecting from the device, the stator having a flat exposed contact surface. The rotor and stator can be rotated relatively about an axis which is perpendicular to the contact surface and passes through the center of mass of the device. A voltage regulator circuit is connected between the generator and the device's battery so that when the apparatus is placed on a support surface with the contact surface frictionally engaging the support and the apparatus is spun about said axis, the generator produces an electrical output which is conditioned by the regulator circuit to recharge the battery.

While the generator and regulator circuit may be included in the electronic device itself, preferably they are present in a case that protectively encloses the device. In any event, as will be described in detail later, the generator is of a flat pancake-type construction that projects or protrudes a minimal distance from the device so that it does not add appreciably to the overall footprint or profile of the device by itself. Also, as will be seen, the regulator circuit adapts or conditions the output signal from the generator to suit the power requirements of the particular device so that by spinning the device, the device's batteries may be recharged in a minimum amount of time.

Thus, the batteries of the present apparatus can be recharged, even when outside power is not available, enabling a user to operate the device whenever that becomes necessary or desirable.

BRIEF DESCRIPTION OF THE DRAWINGS

For a fuller understanding of the nature and objects of the invention, reference should be made to the following detailed description taken in connection with the accompanying drawings, in which:

FIG. 3 is a sectional view taken along line 3-3 of FIG. 2 showing the apparatus' generator and other components in detail;

FIG. 3A is a sectional view taken along line 3A-3A of FIG. 3;

DESCRIPTION OF THE PREFERRED EMBODIMENT

Figure 1:
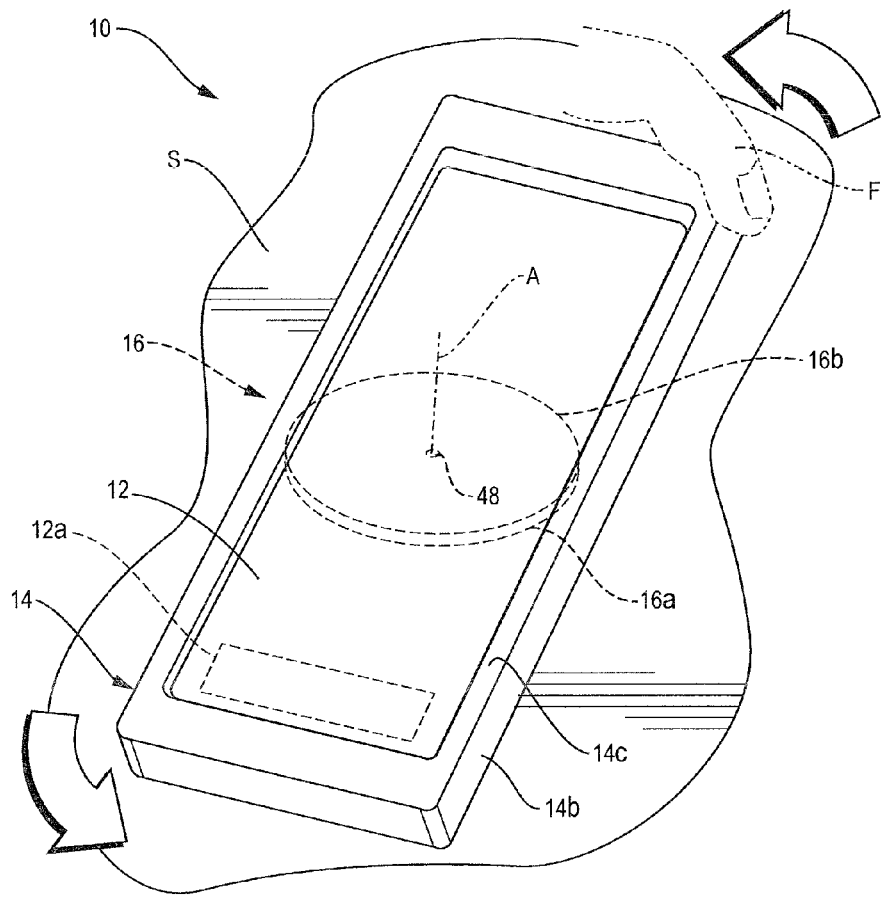
FIG. 1 is a perspective view of a handheld battery-powered apparatus according to the invention.

Referring to FIG. 1 of the drawings, the present apparatus, shown generally at 10, comprises a small electrical or electronic device 12 which is normally powered by one or more internal rechargeable batteries 12a. Device 12 may be any one of a number of conventional handheld or portable electrical or electronic devices, some of which are identified in the background section of this application. The illustrated device 12 happens to be a cell phone that is protectively enclosed in a flexible case 14 which is designed to expose the phone's display screen and to allow access to the phone's various controls and connector ports. These ports include a standard input port 12b (FIG. 3) normally used to recharge the device's battery 12a from a remote power source.

In accordance with the invention, a flat pancake-shaped generator shown generally at 16 is secured by case 14 to the back of device 12. Generator 16 includes a rotor 16b which is fixed to case 14 and a stator 16a which projects somewhat from the back of the case and has an exposed flat undersurface with a high coefficient of friction. Thus, when the apparatus 10 is placed on a support S, e.g. a table, such that the stator 16a frictionally engages that support, and a person spins the case and its contents with his/her finger F about axis A as indicated by the arrows in FIG. 1, the generator 16 produces an electrical output sufficient to charge the battery 12a in device 12. As will be described in detail later, the apparatus 10 includes a voltage regulating circuit which is preferably located in case 14 to adapt and condition the electrical output from generator 16 to charge the particular battery 12a in device 12.

Figure 2:
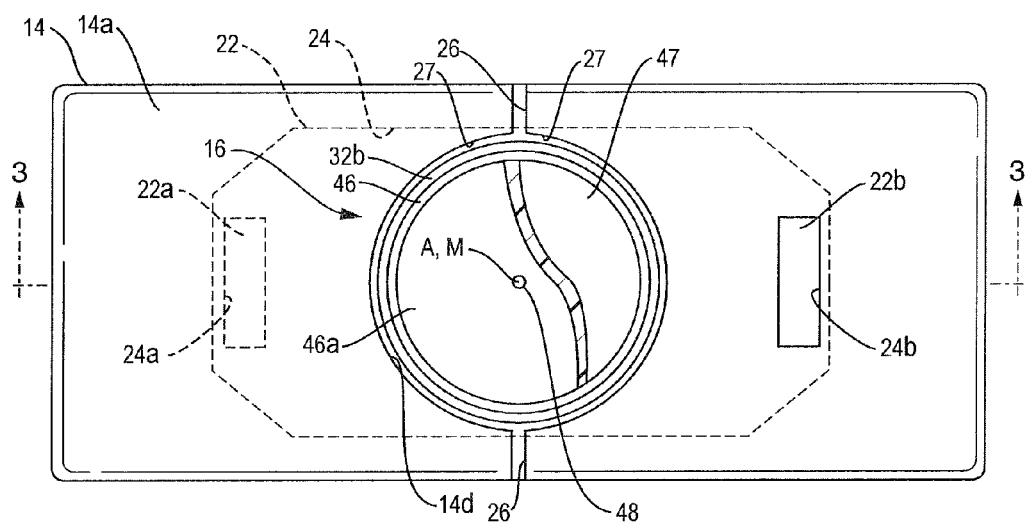
FIG. 2 is a bottom plan view thereof.

Referring now to FIGS. 2 and 3, case 14 includes a bottom wall 14a, a side wall 14b which extends all the way around the device 12 and a top wall in the form of a bezel 14c which frames the front face of device 12. As shown in these figures, the generator 16 is mounted to a thin, rigid plate 22. The ends of plate 22 are formed with protrusions or keys 22a and 22b which extend, respectively, upwardly and downwardly, as best seen in FIG. 3 and the plate 22 is adapted to be received in a pocket 24 formed in the bottom wall 14a of case 14. Access to that pocket is provided via two transverse slits 26 in the outside face of bottom wall 14a which bracket semi-circular cutouts 27. These allow first one end, and then the other end, of plate 22 to be slid into pocket 24 with the cutouts 27 together forming a central opening that provides clearance for generator 16. To lock the plate in the pocket 24, recesses or keyholes 24a and 24b are provided in the upper and lower walls, respectively, of pocket 24 to receive the plate keys 22a and 22b, as best seen in FIG. 3.

Figure 4:
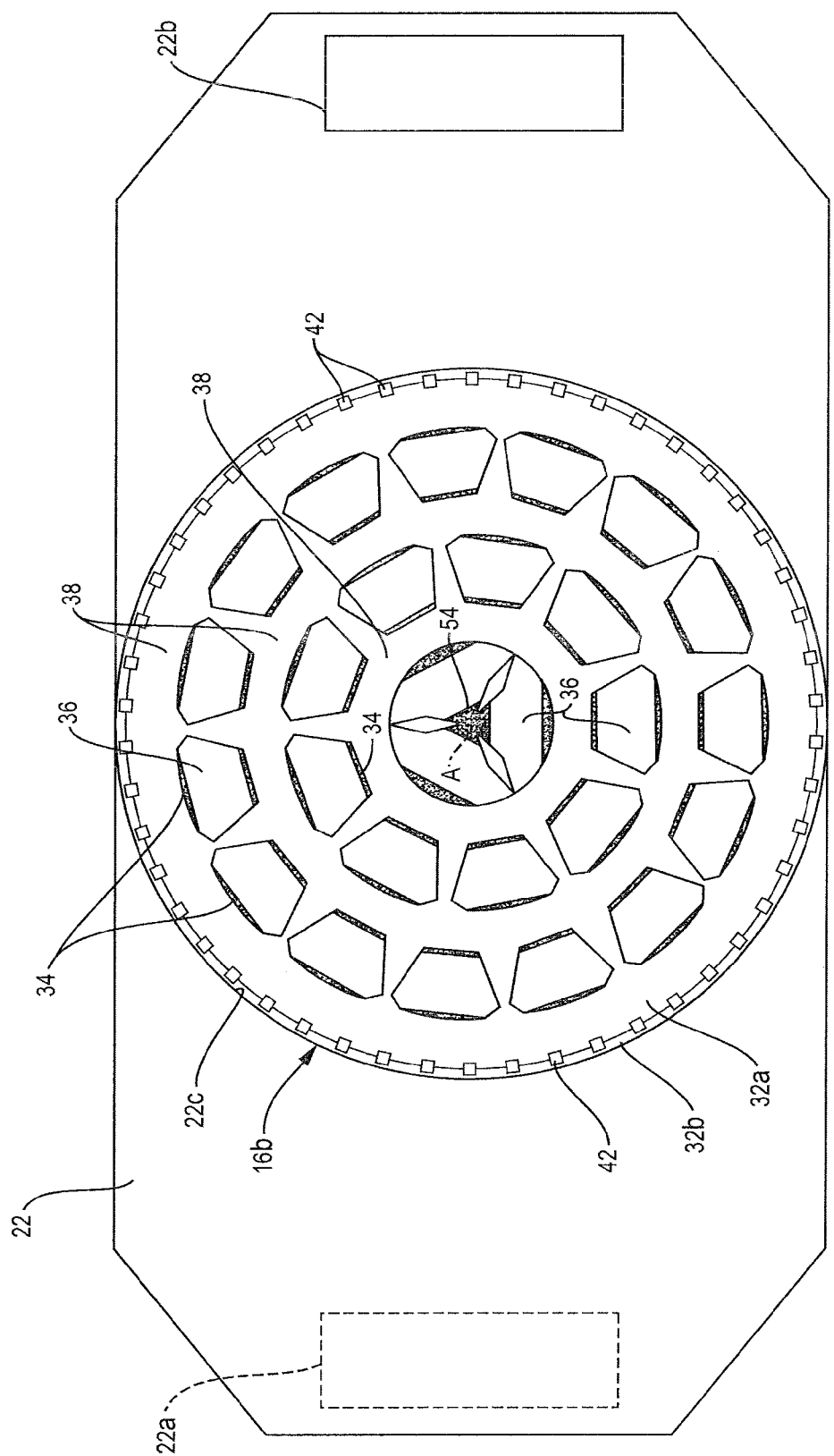
FIG. 4 is a bottom plan view on a larger scale of the rotor of the generator in FIG. 3.

Referring now to FIGS. 3 and 4, the generator's rotor 16b comprises an inverted cup-like member 32 which is mounted in a circular opening 22c centered in plate 22 so that the top wall 32a of member 32 is flush with the plate and the member's side wall 32b extends down through the opening 27, 27 in the bottom wall of case 14.

Mounted to the bottom wall 32a within member 32 are concentric circular arrays of radially oriented ferrite pole pieces 34, each of which is surrounded by a winding 36. In the illustrated embodiment, there are three concentric arrays which are radially spaced to provide three concentric gaps 38 between adjacent arrays and between the outermost array and the member wall 32b. In the apparatus embodiment shown in FIG. 4, there are three pole pieces 34 in the innermost array, nine pole pieces in the middle array and fifteen pole pieces in the outermost array, each pole piece having a corresponding winding 36. The particular number of arrays and the number of pole piece/windings in each array may vary depending on the required generator 16 output voltage.

Also, for reasons to be described later, a multiplicity of small permanent magnets 42 are mounted to the inner surface of the member wall 32b at uniformly spaced-apart locations therearound. The rotor 16b in FIG. 4 has fifty such magnets 42.

Figure 5:
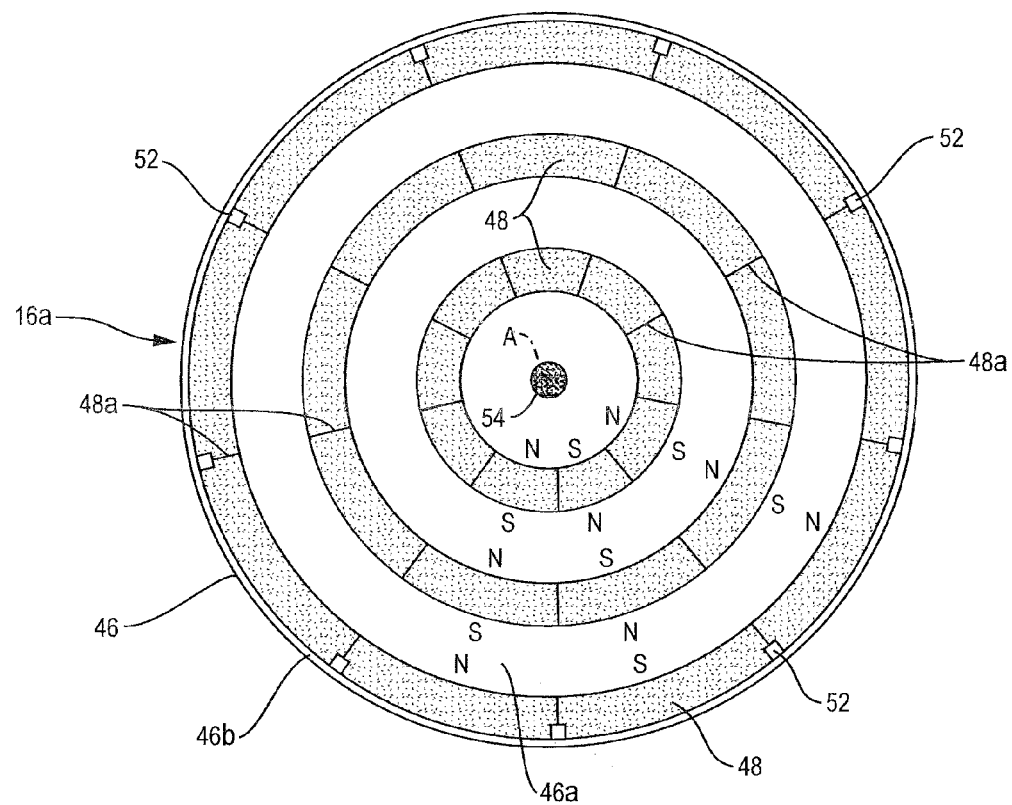
FIG. 5 is a top plan view on the same scale of the stator of the generator in FIG. 3.

Refer now to FIGS. 3 and 5, the stator component 16a of generator 16 comprises a cup-like member 46 having a somewhat smaller diameter than member 32 enabling the former member to nest inside the latter member so that the flat bottom wall 46a of member 46 is even with or slightly below the edge of member wall 32b. Preferably, a thin pad 47 of a material having a high coefficient of friction, e.g. rubber, is adhered to the bottom or outside surface of member wall 46a so that the pad extends down below rotor 16b as shown in FIGS. 2 and 3.

Extending up from bottom wall 46a of stator member 46 are concentric arrays of ring magnets 48, three such arrays being shown in FIG. 5, with the outermost ring magnet 48 hugging the inside surface of side wall 46b of member 46.

Each ring magnet 48 is segmented at a boundary 48a and the segments on opposite sides of the boundary are oppositely radially polarized (N vs. S) so that a magnetic flux change occurs at each boundary. Preferably also, small permanent magnets 52 are provided at each boundary 48a at the radially outer surface of the outermost ring magnet 48 for reasons to be described later. The stator illustrated in FIG. 4 has nine such boundaries 48a and nine magnets 52.

When the stator 16a is positioned within rotor 16b as shown in FIG. 3, the ring magnets 48 extend up into the three concentric gaps 38 in the rotor 16b (FIG. 4). The rotor and stator are rotatably coupled together by rotary bearing or axle 54 extending between their opposing walls 32a and 46a, respectively, so that the rotor 16b can pivot on axle 54 about axis A.

It will be apparent from the foregoing that when the apparatus 10 is placed on a support surface S as shown in FIG. 1 and the case 14 and its contents are spun about axis A, the generator rotor 16b will rotate while the stator 16a remains stationary. The magnetic flux changes encountered by the rotor windings 36 at each magnet boundary 48a will induce a current in those windings as is well known in the art. As indicated diagrammatically in FIG. 6, the windings 36 in the three concentric winding arrays are all wound and connected in series so that in sum, they produce a fluctuating DC voltage when the device 12 is spinning about axis A.

Preferably, the axis A is perpendicular to the plate 22 and to the stator member wall 46a shown in FIGS. 3 and 4 and also passes through the center of mass M of the device 12 and the apparatus as a whole so that during the spinning motion of case 14 and its contents, the apparatus remains in balance so that the electrical output from generator 16 varies in a substantially regular manner. For example, the output from the illustrated generator may vary in a sinusoidal fashion between 8 and 10 VDC while the device is spinning at a reasonable speed, e.g. 50-300 RPM.

Figure 6:
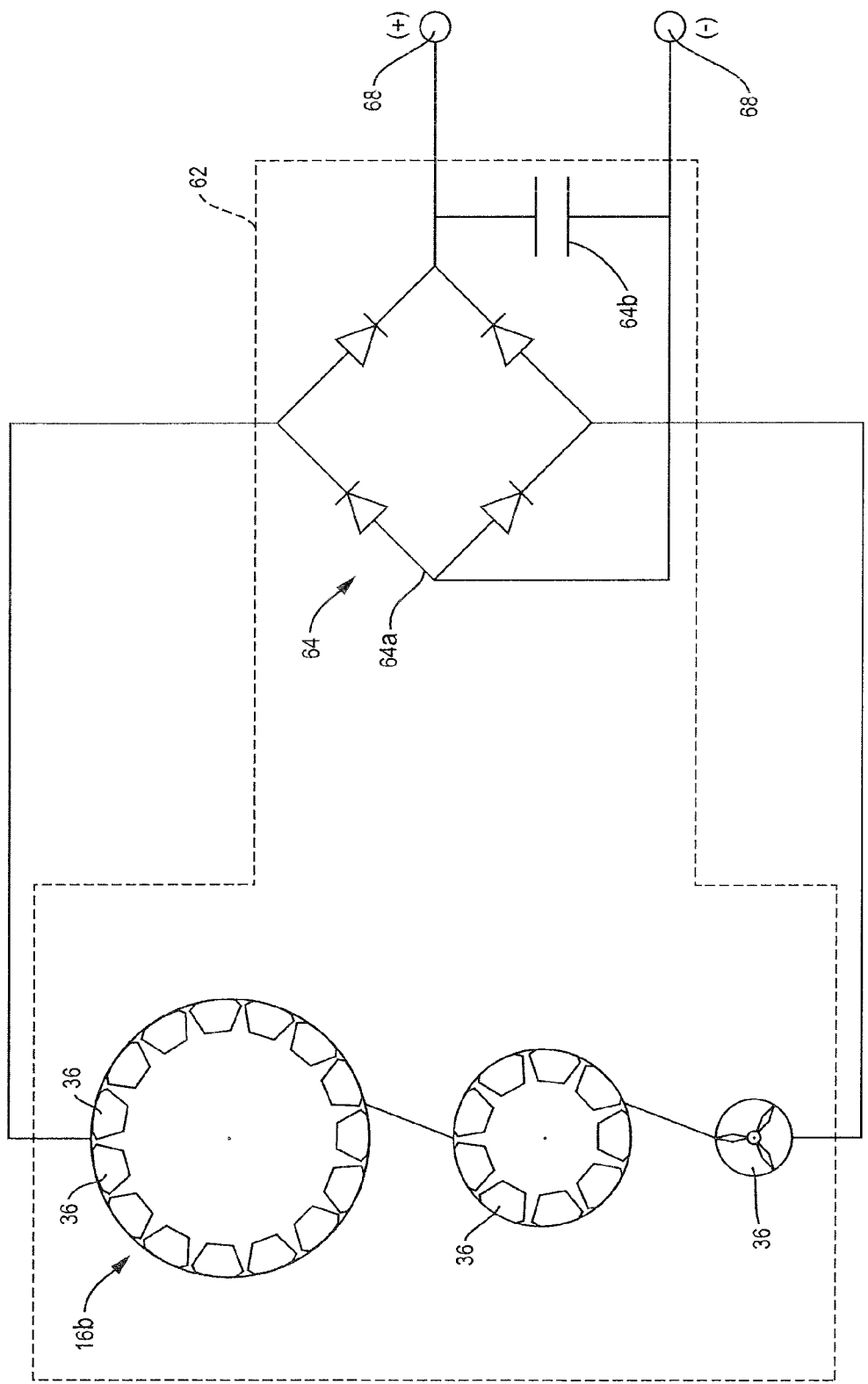
FIG. 6 is a diagrammatic view showing the apparatus' voltage regulating circuit connected to the generator in FIG. 3.

Referring to FIGS. 3 and 6, a printed circuit board 62 is positioned in case 14 above plate 22. Preferably, that circuit is isolated from the case interior by an insulating inner liner 63. The circuit board has printed wiring that connects all of the rotor windings 36 in series and supports a voltage regulating circuit 64 which, in its simplest form, includes a bridge rectifier 64a, the output of which charges a capacitor bank 64b. The capacitors control the rectifier to release 5-7 VDC which is sufficient to charge the batteries 12a in device 12.

A more elaborate regulating circuit 64 may provide a DC output having the same polarity no matter the spinning direction and provide signals to control the device 12 display to apprise the user that the device is spinning at a sufficient recharging rate and to display other relevant parameters.

In any event, the output of the regulating circuit 64 appears on terminals 68 which plug into port 70a of a charging dock 70 at an end of case 14. The charging dock 70 also has a connector 70b arranged and adapted to plug into the standard battery charging port 12b of device 12 when the device is in case 14. Since the voltage regulation circuit 64 is located in case 14 and is not part of generator 16 per se, it can be matched to the particular device 12 in case 14 so that the device's batteries receive the proper charge. If, in a given application, the output voltage from a generator 16 should have to be reduced for some reason, this may be done simply by bypassing one or more of the windings 36 at the circuit board 62 with the remaining windings remaining in series.

When the user's finger F angularly accelerates case 14 and its contents up to speed as described above, the rotational inertia of the device will keep it spinning for an appreciable length of time before another spinning impulse from the user is required. To prolong the duration of each spin, the aforesaid permanent magnets 42 and 52 are provided on the generator's rotor 16*b* and stator 16*a*, respectively. These permanent magnets are radially polarized so that their magnetic flux lines are more or less perpendicular to the fluxes at the boundaries 48*a* of the outermost ring magnet 48 of the stator 16*a*. Thus, they function to minimize so-called "cogging" of the generator's rotor 16*b* when the generator is under a load, i.e. while charging battery 12*a*.

It will be appreciated from the foregoing that the present apparatus can be used in many situations in which external power is unavailable to recharge the device's battery 12*a*. Indeed, even if that battery is defective, the device 12 can be powered directly by generator 16 as long as the device is spinning. For example, if the device 12 is a flashlight, it can still provide light in an emergency.

It will thus be seen that the objects set forth above, among those made apparent from the preceding description, are efficiently attained. Also, certain changes may be made in the above construction without departing from the scope of the invention. For example, the roles of the rotor and stator may be reversed so that the ring magnets 48 move with case 14, while the pole pieces/windings remain stationary. Therefore, it is intended that all matter contained in the above description or shown in the accompanying drawings shall be interpreted as illustrative and not in a limiting sense.

What is claimed is:

1. A rotationally rechargeable electrical apparatus comprising
   an electronic device having a front, a back and a center of mass and containing a battery;
   an electrical generator, said generator including a rotor secured to the back of the device and a stator having a flat contact surface extending generally parallel to the back of the device, said rotor and stator being rotatably connected together so that they can rotate relatively about an axis that extends perpendicular to said contact surface and passes through said center of mass, and
   a voltage regulating circuit connected electrically between the generator and the battery so that when the apparatus is placed on a support so that said contact surface frictionally engages said support and the device is spun about said axis, the generator produces an electrical output that is conditioned by said regulating circuit to charge said battery.

2. The apparatus defined in claim 1 wherein the device is selected from the group consisting of cell phone, camera, game, TV, radio, lamp, recorder, audio or video player and GPS receiver.

3. The apparatus defined in claim 1 wherein the generator and regulating circuit are in a case which encloses the device.

4. The apparatus defined in claim 3 wherein the regulating circuit is on a circuit board sandwiched between the back of the device and the generator.

5. The apparatus defined in claim 1 wherein one of the rotor and stator includes at least one circular array of radially polarized magnets and the other of the rotor and stator includes at least one circular array of windings, both arrays being centered on said axis so that when the rotor and stator rotate relatively, a voltage is induced in the windings.

6. The apparatus defined in claim 5 wherein the rotor and stator contain an equal plurality of said arrays spaced concentrically from said axis so that the magnets and windings alternate in the radial direction.

7. The apparatus defined in claim 6 and further including small radially polarized boundary magnets positioned at said boundaries at the perimeter of the outermost circular array of magnets.

8. The apparatus defined in claim 7 and further including a multiplicity of small radially polarized permanent magnets fixedly distributed in a circle around said boundary magnets.

9. The apparatus defined in claim 6 wherein all of said windings are connected in series so that the generator output is the sum of the voltages induced in said windings.

10. The apparatus defined in claim 9 wherein the voltage regulating circuit includes a bridge rectifier and a capacitor bank for rectifying and releasing to the battery a DC charging voltage suitable for the battery.

11. A rotationally rechargeable electronic apparatus comprising
    a flexible case for encasing an electrical device, said case including a back wall with a pocket therein;
    a pancake-type generator, said generator including a stator and a rotor rotatably coupled together for rotation about an axis to provide an electrical output, said stator including a flat contact surface extending perpendicular to axis;
    a support plate secured to the rotor and extending perpendicular to said axis, said plate being received in said pocket so that the generator protrudes from the back wall of the case and said axis extends through the center of mass of the case and any contents thereof, and
    a voltage regulating circuit adjacent to the back wall of the case and connected to receive said electrical output so that when the apparatus is placed on a support so that the contact surface frictionally engages the support and the case is spun about said axis, the generator produces a regulated electrical output suitable for charging a battery.

12. The apparatus defined in claim 11 and further including
    an electrical device received in said case, said device including a battery and having a center of mass positioned on said axis, and
    electric connections in said case, said connections extending between the voltage regulating circuit and the battery so that the battery is charged during the spinning of the case and its contents.

13. The apparatus defined in claim 12 wherein said connections include
    a charging port in the device, said port being connected to said battery, and
    a charging dock in a wall of the case and which is connected to the regulating circuit, said dock including a connector portion positioned to plug into said port when the device is received in the case.

14. The apparatus defined in claim 11 wherein one of the rotor and stator includes at least one circular array of radially polarized magnets and the other of the rotor and stator includes at least one circular array of windings, both arrays being centered on said axis so that when the rotor and stator rotate relatively, a voltage is induced in the windings.

15. The apparatus defined in claim 14 wherein the rotor and stator contain an equal plurality of said arrays spaced concentrically from said axis so that the magnets and windings alternate in the radial direction.

16. The apparatus defined in claim 15 and further including small radially polarized boundary magnets positioned at said boundaries at the perimeter of the outermost circular array of magnets.

17. The apparatus defined in claim 16 and further including a multiplicity of small radially polarized permanent magnets fixedly distributed in a circle around said boundary magnets.

18. The apparatus defined in claim 15 wherein all of said windings are connected in series so that the generator output is the sum of the voltages induced in said windings.

19. The apparatus defined in claim 18 wherein the voltage regulating circuit includes a bridge rectifier and a capacitor bank for rectifying and releasing to the battery a DC charging voltage suitable for the battery.

* * * * *